United States Patent [19]

Schulz

[11] 3,741,564

[45] June 26, 1973

[54] TRI-CAPSTAN TAPE TRANSPORT

[75] Inventor: Gordon Schulz, Tujunga, Calif.

[73] Assignee: Odetics, Inc., Anaheim, Calif.

[22] Filed: Feb. 11, 1972

[21] Appl. No.: 225,507

Related U.S. Application Data

[63] Continuation of Ser. No. 59,879, July 31, 1970, abandoned.

[52] U.S. Cl. .................. 274/4 D, 226/108, 226/188, 226/49, 226/195

[58] Field of Search .................... 226/108, 195, 183, 226/188, 49; 74/722, 219; 274/4 D

[56] References Cited

UNITED STATES PATENTS

| | | | |
|---|---|---|---|
| 1,442,037 | 1/1923 | Bamford | 74/722 X |
| 2,583,618 | 6/1971 | Lewis | 226/195 |
| 3,335,929 | 8/1967 | Branco et al. | 226/108 |
| 3,421,674 | 1/1969 | McCammon | 226/195 |

FOREIGN PATENTS OR APPLICATIONS

| | | | |
|---|---|---|---|
| 843,259 | 6/1939 | France | 226/188 |

*Primary Examiner*—Allen N. Knowles
*Attorney*—Philip M. Hinderstein

[57] ABSTRACT

A tape transport for use in a precision magnetic tape recorder/reproducer including three capstans with associated capstan pulleys driven by a single motor pulley. Bi-directional differential operation is achieved by providing a "hard" drive between the motor pulley and the capstan pulleys and by varying the diameter of the capstans so that the outer two capstans rotate at a higher peripheral velocity than the central capstan. In this manner, differential tension is created between the second and third capstans regardless of the direction of tape movement. The present tape transport further includes a plurality of idlers which control the path of the magnetic tape to achieve a cumulative wrap angle of more than 600° without any capstan contacting the oxide side of the magnetic tape. Such tape path further provides a plurality of tangent points for locating magnetic heads to improve tape-to-head compliance and stability.

25 Claims, 3 Drawing Figures

TRI-CAPSTAN TAPE TRANSPORT

CROSS-REFERENCE TO RELATED APPLICATION

This application is a continuation of my co-pending U. S. Pat. application Ser. No. 59,879, filed July 31, 1970, now abandoned.

BACKGROUND OF THE INVENTION

1. Field of the Invention

The present invention relates to a tri-capstan tape transport and, more particularly, to a bi-directional, differential capstan, tape transport for use in a precision magnetic tape recorder/reproducer which minimizes flutter, creep, and time displacement errors.

2. Description of the Prior Art

A conventional magnetic tape recorder/reproducer includes a supply reel and a take-up reel, between which extends a length of magnetic tape. The magnetic tape typically consists of a paper or plastic base coated with a thin layer of iron oxide. A tape transport draws the magnetic tape along a particular path from the supply reel to the take-up reel. Positioned within this path are one or more magnetic heads for recording information on the tape and for reproducing information from the tape.

The most commonly employed tape transport comprises a single rotating capstan, often a motor shaft, positioned on one side of the tape path and a rotatably mounted pressure roller which is positioned on the opposite side of the path. By moving the pressure roller against the tape so as to press the tape against the drive capstan, sufficient frictional force is created between the capstan and the tape to permit the capstan to draw the tape along its predetermined path.

Difficulty has been encountered in the past in the construction of tape transports suitable for use in precision magnetic tape recorder/reproducers where extremely low flutter, creep, and time displacement errors are essential. More specifically, the primary function of a capstan is to move the magnetic tape past the magnetic heads at a precisely constant, invariable velocity. Unfortunately, the peripheral velocity of the capstan does not accurately reflect the linear tape speed past the magnetic heads. The lack of tape-to-capstan synchronism is the phenomenon known as "creep". Any time an input-to-output tension variation exists, there must be a localized slippage between capstan and tape. This slippage, or creep, is directly proportional to both the load on the tape and the compliance of the tape. Moreover, the velocity anomalies resulting from creep are directly related to flutter and skew.

Much of the input-to-output tension variation results from the take-up and supply reels which have fairly large inertias and drive means of uncertain torque constancy connected thereto. accordingly, the tape being supplied to and drawn away from the capstan zone has tension variations therein. These tension variations are necessarily present at the head which is recording or reading data on the tape since a single capastan cannot isolate the heads from both reels.

A typical prior art approach to solving these problems is the use of two capstans which are positioned at spaced points along the path of the tape, on opposite sides of the magnetic heads. The use of dual capstans located at the extremities of the magnetic heads tends to isolate reel perturbations from the head area, thereby reducing flutter, creep and time displacement errors from the record/reproduce function.

In a dual capstan system, a typical technique to reduce flutter is the use of differential capstans. That is, the take-up capstan is driven at a slightly higher rate than the supply capstan so that the tape is drawn across the magnetic heads under tens1on. In this manner, variations in the rate at which the magnetic tape is drawn past the heads are minimized.

Whle differential capstans sometimes improve performance, the methods used to generate differential capstans many times produce more flutter than their advantages remove. More specifically, there are several basic ways generally employed to achieve differential capstans in a dual capstan system. In the first instance, separate motors may be used for driving each capstan in adual capstan type of tape transport. However, this entails not only a duplication of parts, but also creates problems in the proper servo control of the two motors in order that each motor may operate precisely in unison to draw the tape without flutter across the heads. It has, therefore become ncessary to utilize a single motor to drive both capstans. However, still additional problems have been created in the techniques for couping the single motor to the dual capstans.

The most common technique for coupling a single motor to a plurality of capstans is to couple the motor pulley to the capstan pulleys with an elastic belt and to rely on the compliance of the belts to provide a differential drive. That is, differential tension is attained by relying on the stretching of the electric belt by different amounts in different locations in the path between the drive pulley and the two capstan pulleys. This method, while achieving differential motor, is simply too "soft" to effectively isolate perturbations in the system. A drive is judged "hard" or "soft" depending on the amount of unsupported drive belt lengths between the drive and capstan pulleys. As the unsupported belt lengths are decreased, the spring constant and thus the natural frequency is increased. The higher natural frequency not only means a lesser resonant amplitude, but also that a higher servo bandwidth can be obtained thereby achieving a better dynamic system.

In all prior art tape transports utilzing an elastic drive, the system always had an instability problem, particularly after the system has run for a period of time. That is, as the system would tend to wear and the parts became rough or transient disturbances occurred, the ability of the motor servo to correct for these fluctuations was ineffective, primarily because of the elastic "softness" of the transport. In fact, the elasticity would produce an effect opposite to that desired; it would tend to amplfy the irregularities rendering system performance marginal. Furthermore, since the tension value in all elastic drives is dependent on the material properties of the belts, such tension is subject to change over temperature, humidity, and age.

The most successful technique for eliminating the problems associated with elastic drives while maintaining the advantages of a single motor is to provide a "hard" drive between the motor pulley and the capstan pulleys and by varying the diameter of the two capstan pulleys. In other words, by driving the two capstan pulleys with the same belt while decreasing the diameter of the take-up capstan pulley relative to the diameter of the supply capstan pulley, the take-up capstan will rotate at a higher rate than the supply capstan by an amount directly proportional to the ratios of the diameters of the pulleys. This approach has the further advantage that the amount of differential may be accurately controlled within a much wider range of values than possible with an electric drive.

While this method achieves differential motion, there is a problem which limits the usefulness thereof. More specifically, in many tape recorders it is desirable for the tape to operate in both directions, instead of merely in one direction. For example, in high-density, spaceborne recorders, it is often necessary to record data while the tape is traveling in one direction and then to reproduce the data while the tape is traveling in the opposite direction. Therefore, in a dual capstan system which utilizes the inherent velocity relationship created with capastan pulleys of different diameters, it becomes necessary to provide some mechanism for switching the functions of the capstans when operation in the reverse direction is desired.

One method utilizes two belts mounted over a pair of pulleys, one slightly larger, to make one of the capstans turn faster. An idler roller is actuated by a power control which merely tightens one or the other of the belts to the pulleys. However, this method presents difficulty in controlling the loose belt under dynamic conditions. Another method merely runs a single belt off the crowns of one set of pulleys to the crowns of another set of pulleys. However, this method presents problems in relaible belt switching because it relies on a canted roller which cork-screws the belt from one crown to the other. Furthermore, the belt will sometimes run off the pulleys. Therefore, in the case of bi-directional, dual capstan systems, it has been necessary to revert to the two motor approach, with its inherent synchronization problems, or to rely on the use of elastic drives, with its inherent sensitivity to flutter and time displacement errors in the presence of humidity, temperature, vibration and/or age.

Still a further technique for isolating the magnetic heads from external vibrations is suggested in U.S. Pat. No. 3,421,674 to Robert F. McCammon for Tri-Capstan Drive and Web Tensioner, issued Jan. 14, 1969. McCammon discloses a three capstan drive arrangement in which the tape may be driven in either direction with the leading capstan always rotating at a faster revolution per unit time than the following capstan. However, this is achieved using the elastic belt phenomenon discussed previously, which phenomenon is described in McCammon from column 3, line 38 through column 4, line 2. As a result, the system of McCammon is subject to the same instability problem inherent in dual capstan systems using elastic belts.

Considering further the phenomenon known as "creep", the creep effect, when distributed around the periphery of a capstan, produces two zones of action — the inactive zone and the active zone. The greater the tension variations, the greater the active-to-inactive zone ratio. The active zone is the portion of the tape that is doing the driving or that segment in perfect synchronism with the capstan. The active/inactive zones are a function of the coefficient of friction, the amount of tape wrap, and the input/output tape tension ratio. It would therefore seem logical that in order to improve the instantaneous tape-to-capstan synchronism, one would either increase the coefficient of friction or increase the tape wrap. Obviously, the friction cannot be increased because of the limitations of available materials. Therefore, the only logical step is to increase the wrap. Again, because of the physical restraints, 200° of tape wrap is about the practical limit for any one capstan. Therefore, in a single capstan system, 200° of tape wrap is all that is available and in a dual capstan system, only 400° of tape wrap is available. In a tri-capstan tape drive, a cumulative wrap angle of 600° or more is theoretically possible. This was one of the objectives in the beforementioned U. S. Pat. No. 3,421,674 to McCammon. However, such maximum was never achieved. Furthermore, in McCammon, a tri-capstan drive is achieved only by having one of the capstans contact the oxide side of the magnetic tape. This is an undesirable feature in a precision tape system.

Still another area which affects performance in precision magnetic tape recorder/reproducers is tape-to-head compliance and stability. As with the phenomenon of creep, head compliance and stability may be improved by reducing the unsupported length of tape between the capstan and the record/reproduce heads. In the past, most precision instruments have not permitted all heads to be located adjacent a capstan.

SUMMARY OF THE INVENTION

In accordance with the present invention, there is provided a tape transport for use in a precision magnetic tape recorder/reproducer which truly minimizes flutter, creep, and time displacement errors by eliminating the disadvantages and problems discussed previously. The present tape transport utilizes three capstans thereby incorporating the advantage thereof of effectively placing two stages of active buffering between the supply reel and the active heads. However, the present tri-capstan tape transport permits bi-directional differential operation without the use of a plurality of motors, without the use of elastic belts, and without the necessity for belt switching. That is, the present tape transport utilizes a single motor to provide a hard drive between the motor pulley and the capstan pulleys and varies the diameter of the capstan pulleys or the capstans in a unique manner to provide any degree of differential operation, regardless of the direction in which the tape moves.

Briefly, the present tape transport for use in a precision magnetic tape recorder/reproducer includes first, second, and third capstans mounted for rotation around spaced parallel axes and arranged to sequentially contact the tape, the diameter of the first and third capstans being greater than that of the second capstan, and first, second, and third capstan pulleys associated with the first, second, and third capstans, respectively, the first, second, and third capstan pulleys having diameters equal to each other. The capstan pulleys are equally spaced around a drive pulley which is associated with a drive motor. A plurality of belts interconnect the drive pulley with the capstan pulleys in a "hard" drive configuration so that the capstans are driven at the same rotational speed. However, because of the difference in diameters of the capstans, the two outer capstans rotate at a higher peripheral velocity than the central capstan. In this manner, differential tension is created between the central capstan and the outer two capstans regardless of the direction of tape movemement.

The present tape transport further includes a plurality of idlers which control the path of the magnetic tape to maximize the wrap of the tape around the capstans to improve the instantaneous tape-to-capstan synchronism, thereby still further minimizing creep. As a practical matter, the present tape transport is capable of achieving a cumulative wrap angle of more than 600° without any capstan contacting the oxide side of the magnetic tape. Furthermore, by wrapping the tape around the outside of the capstan, there is provided a plurality of tangent points adjacent which magnetic heads can be located, where tape direction is well defined, thereby improving tape-to-head compliance and stability.

OBJECTS

It is therefore an object of the present invention to provide a tri-capstan tape transport.

It is a further object of the present invention to provide a bi-directional, differential capstan, tape transport for use in a precision magnetic tape recorder/reproducer which minimizes flutter, creep, and time displacement errors.

It is a still further object of the present invention to provide a tape transport which places two stages of active buffering between the supply reel and the active magnetic heads.

It is another object of the present invention to provide a bi-directional, differential capstan, tape transport without the use of a plurality of motors, elastic belts, or belt switching.

It is still another object of the present invention to provide a tape transport which utilizes a single motor to provide a "hard" drive between the motor pulley and the capstan pulleys and varies the diameter of the capstans or the capstan pulleys in a unique manner to provide any degree of differential operation, regardless of the direction in which the tape moves.

Another object of the present invention is the provision of a tri-capstan tape transport which maximizes tape wrap and minimizes creep.

Still another object of the present invention is the provision of a tri-capstan tape transport having improved tape-to-headcompliance and stability.

An additional object of the present invention is to minimize the life-limiting factors on critical capstan drive components in a tape transport.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
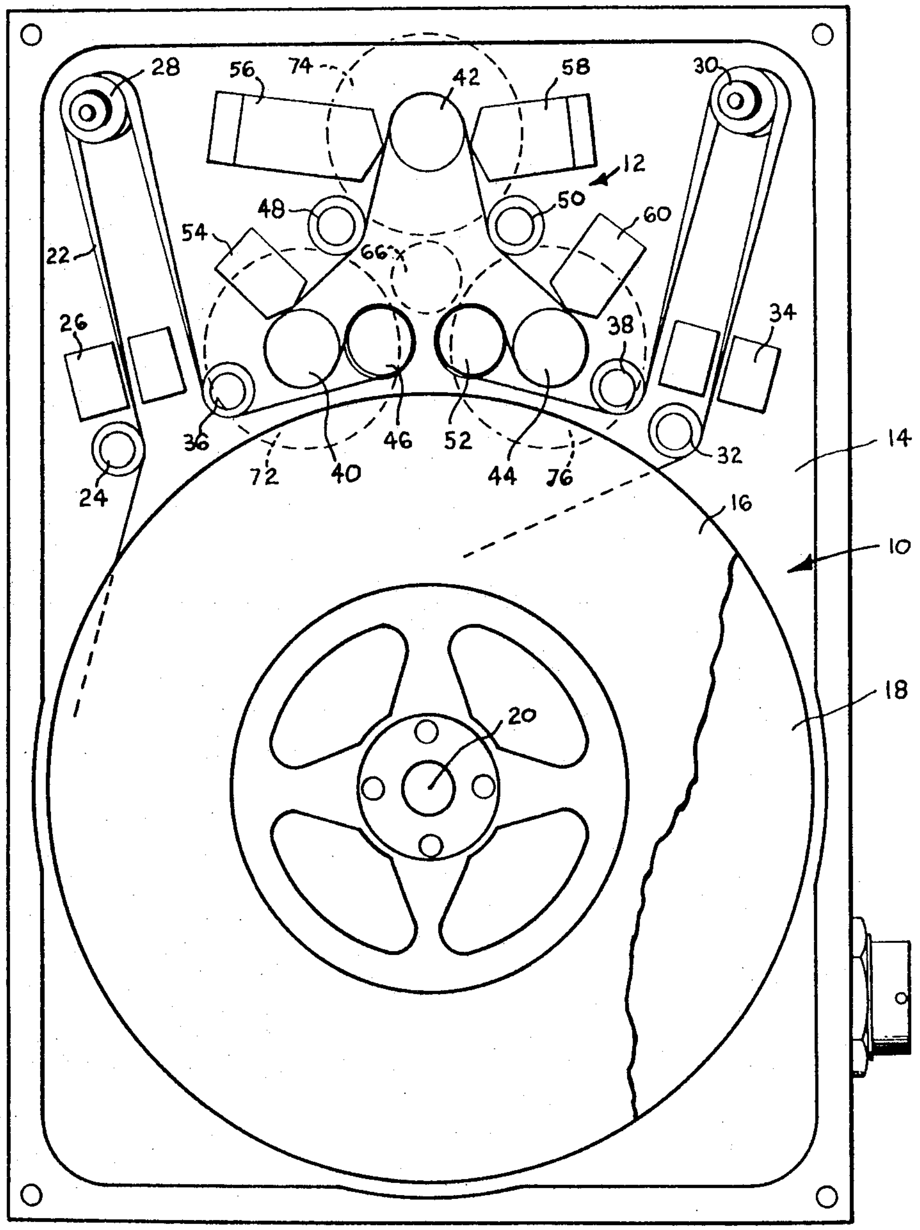
FIG. 1 is a top plan view of a precision magnetic tape recorder/reproducer incorporating the present tri-capstan tape transport.

Referring now to the drawings and, more particularly, to FIG. 1 thereof, there is illustrated a precision magnetic tape recorder/reproducer, generally designated 10, which incorporates the present tri-capstan tape transport, generally designated 12. Recorder/reproducer 10 serves as an illustrative embodiment for tape transport 12 and includes a flat supporting deck 14 upon which a pair of reels 16 and 18 are coaxially mounted on an axis 20. However, it will be apparent to those skilled in the art that reels 16 and 18 may be mounted in the usual side-by-side relationship, thus requiring larger space on supporting deck 14. In any event, reels 16 and 18 are of conventional construction and are driven by suitable coaxial tape reel drive means so that reels 16 and 18 are suitably torqued for take-up and tension drag, depending upon the direction of tape movement.

Extending between reels 16 and 18 is a length of magnetic tape 22 of conventional type. For description purposes, bottom reel 18 may be considered as a supply reel which turns in a clockwise direction to supply tape 22 to tape transport 12. A proper amount of tape drag is accomplished by providing a dynamic brake on reel 18. Upon leaving reel 18, tape 22 proceeds around an idler 24 and then past erase heads 26 which are positioned on opposite sides of the tape path. Erase heads 26 are conventional units positioned to erase, when activated, the information on tape 22 before it proceeds to the record heads. Since erase heads 26 do not require closely controlled tape speeds to be effective, they are positioned between reel 18 and tape transport 12.

Tape 22 next proceeds around a skewed idler 28. Since reels 16 and 18 are coaxial, it is necessary to bring tape 22 from the plane of one reel to the plane of the other reel. Furthermore, the plane of tape 22 in the zone of tape transport 12 may be the same as the plane of one or the other of reels 16 and 18. However, in the present case, the plane in which tape 22 moves through tape transport 12 is intermediate the planes of reels 16 and 18. Thus, skewed idler 28 operates to elevate tape 22 from the plane of bottom roller 18 to the plane of tape transport 12.

Tape 22 then passes through tape transport 12 and around a second skewed idler 30 to be elevated to the plane of top reel 16. Tape 22 then passes between a second pair of erase heads 34 which are positioned to erase the information on tape 22 when tape 22 is traveling in the opposite direction. Finally, tape 22 proceeds around an idler 32 and is wound on top reel 16, which, in this case, acts as the take-up reel, and which turns in a counterclockwise direction. A proper amount of torque is applied to reel 16 from suitable means to take up take 22 as it is supplied from tape transport 12.

Figures 2, 3:
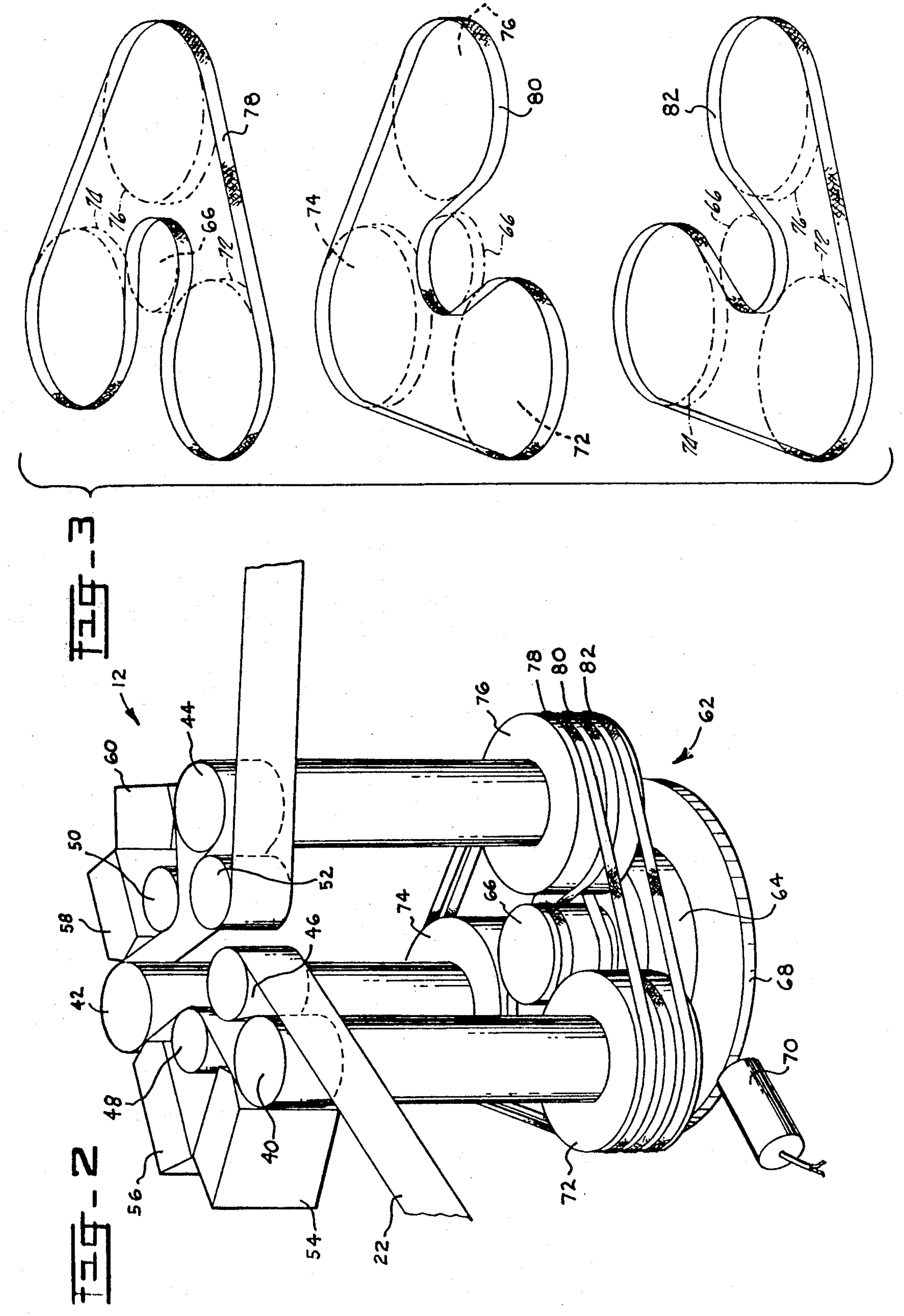
FIG. 2 is a perspective view of the tri-capstan tape transport of FIG. 1, shown in the absence of the supporting deck and bearings, for clarity.
FIG. 3 is an exploded view of the drive portion of the tape transport of FIGS. 1 and 2 showing the three drive belts in relationship to the motor pulley and capstan pulleys.

Referring now to FIGS. 1 and 2, tape transport 12 includes first, second, and third capstans 40, 42, and 44 which are rotatably mounted on supporting deck 14 and have circumferential drive surfaces positioned above deck 14, around which tape 22 is engaged. Furthermore, in order to drive only one side of tape 22 and to maximize the wrap of tape 22 around capstans 40, 42, and 44 to improve the instantaneous tape-to-capstan synchronism, tape transport 12 further includes a plurality of idlers 36, 38, 46, 48, 50, and 52 which are rotatably mounted with respect to deck 14 and which guide tape 22 with respect to the tape-engaging drive surfaces on capstans 40, 42, and 44. As can be seen in FIGS. 1 and 2, idlers 46 and 48 wrap tape 22 around capstan 40, idler 36 directing tape 22 from skewed idler 28 to idler 46. Idlers 48 and 50 wrap tape 22 around capstan 42 whereas idlers 50 and 52 wrap tape 22 around capstan 44. Finally, idler 38 directs tape 22 from idler 52 to skewed idler 30. Therefore, the effect of idlers 36, 38, 46, 48, 50, and 52 is to control the path of tape 22 to maximize the wrap thereof around capstans 40, 42, and 44 to improve the instantaneous tape-to-capstan synchronism, thereby further minimizing creep. As a practical matter, tape transport 12 is capable of achieving a cumulative wrap angle of more than 600° without any one of capstans 40, 42, or 44 contacting the oxide side of tape 22.

The path of magnetic tape 22 created by idlers 36, 38, 46, 48, 50, and 52 in combination with capstans 40, 42, and 44 further provides a plurality of tangent points adjacent which a plurality of magnetic heads 54, 56, 58, and 60 can be located. More specifically, tape-to-head compliance and stability may be improved in a precision tape recorder/reproducer by reducing the unsupported length of tape between a capstan and a record or reproduce head. In the present case, heads 54 and 56 are positioned adjacent tape 22 between capstans 40 and 42 and heads 58 and 60 are positioned adjacent tape 22 between capstans 42 and 44. Several of these heads may be recording heads and several may be reproducing heads, depending upon the direction of tape motion and the specific application for which recorder/reproducer 10 is specifically designed. When tape 22 is moving from reel 18 to reel 16 and recording is desired, heads 58 and 60 are preferably recording heads, to isolate them as much as practical from supply reel 18 from which tape 22 is being delivered. In such a case, heads 54 and 56 are reproduce heads for employment when tape 22 is running in the opposite direction.

Whether or not heads 54, 56, 58, and 60 are record or reproduce heads, tape 22 should be supported directly adjacent the position where it contacts each head. Thus, heads 54, 56, 58, and 60 are each positioned directly adjacent the point where tape 22 is tangent to a capstan drive surface, the unsupported length of tape between each capstan and the head being reduced to one tenth of an inch or less. Thus, tape 22 is rigidly supported at that location and its position is accurately defined. It is particularly significant to note that with the tape path provided by idlers 36, 38, 46, 48, 50, and 52, all of heads 54, 56, 58, and 60 may be located as above, thereby improving tape-to-head compliance and stability regardless of the direction or mode of operation.

Capstans 40, 42, and 44 are driven by a motive means, generally designated 62. Motive means 62 comprises a motor 64 which carries a motor pulley 66. Furthermore, the lower end of capstans 40, 42, and 44 carry capstan pulleys 72, 74, and 76, respectively, which are rigidly secured thereto so that the rotation of the pulleys causes capstan rotation. The interconnection between motor pulley 66 and capstan pulleys 72, 74, and 76 will be described more fully hereinafter. For present purposes, suffice it to say that each of capstan pulleys 72, 74, and 76 is driven by capstan pulley 66.

According to the present invention, tape transport 12 permits bi-directional differential capstan operation so as to minimize flutter, creep, and time displacement errors in a precision magnetic tape recorder/reproducer. Furthermore, tape transport 12 permits such operation without the use of a plurality of motors, without the use of elastic belts, and without the necessity for belt switching. More specifically, tape transport 12 achieves bi-directional differential operation by utilizing the inherent velocity relationship of a three-capstan approach. That is, tape transport 12 consists of three capstans 40, 42, and 44, center coupled to motor 64 in a manner to be described more fully hereinafter. Capstans 40 and 44 are located at each extreme of the head area, while capstan 42 is located between heads 54 and 56 on the one hand and heads 58 and 60 on the other hand. Simply by varying the diameters of capstans 40, 42, and/or 44 or by varying the diameters of capstan pulleys 72, 74, and/or 76, the existence and the amount of differential tension can be controlled for environment, operating mode, or direction of tape travel.

First, making the assumption that the diameters of capstan pulleys 72, 74, and 76 are equal so that they rotate at the same speed, circumferential speed of the capstan drive surfaces can be controlled by varying the diameters of capstans 40, 42, and 44, respectively. Furthermore, while this discussion is directed to the control of tape tension by control of the diameters of the capstan drive surfaces, it will be clear to those skilled in the art that equally useful results can be obtained by maintaining the diameters of capstans 40, 42, and 44 equal while changing the relative diameters of capstan pulleys 72, 74, and 76.

In any event, in order to achieve bi-directional differential operation for recording in one direction and reproducing in the opposite direction, a differential tension is maintained by adjusting the diameter of capstan 42 to be less than the diameters of capstans 40 and 44 by the amount of differential tension desired. The diameters of capstans 40 and 44 may be equal, but this is not required. In other words, the peripheral velocity of capstan 42 is slightly less than that of both capstans 40 and 44. With tape traveling from reel 18 to reel 16, the tape between capstans 40 and 42 has a negative differential in that the tape-up capstan, capstan 42, is rotating slower than the supply capstan, capstan 40. However, between capstans 42 and 44 there is positive differential in that the tape-up capstan, capstan 44, is rotating faster than the supply capstan, capstan 42. Therefore, tape heads 58 and 60 would be operative with tape movement in this direction.

When the direction of tape 22 is reversed, the tape between capstans 42 and 44 is considered to be undergoing negative differential since the take-up capstan, capstan 42, is rotating slower than the supply capstan, capstan 44. However, the length of tape 22 between capstans 40 and 42 is in positive differential since the take-up capstan, capstan 40, is rotating faster than the supply capstan, capstan 42. Under these circumstances, tape heads 54 and 56 would be operational.

Thus, differential tension is accomplished simply by reversing the direction of tape 22 without the use of a plurality of motors, without the use of elastic belts, and without the necessity for belt switching.

It has been experimentally determined that the reel that supplies the tape contributes more perturbation to the uniform feed thereof through the capstan drive mechanism than does the take-up reel. Thus, the construction just described is superior in that it provides two capstans between the supply reel and the active heads in both the record and reproduce modes, for most satisfactory and uniform tape drive.

In order to fully realize the advantages to be derived with tape transport 12, motive means 62 must provide a "hard" drive for capstans 40, 42, and 44. As explained previously, a drive is judged "hard" or "soft" depending upon the amount of unsupported drive belt lengths between the drive and capstan pulleys. As the unsupported belt lengths are decreased, coupling compliance is reduced. When the compliance is reduced, mechanical resonant frequencies are increased which, in turn, minimizes the amplitude of mechanical resonances to a minimum for a given perturbance. The higher natural frequency also means that a higher servo bandwidth can be obtained, thereby achieving a better dynamic system.

According to the present invention, and with reference now to FIGS. 2 and 3, motive means 62 comprises motor 64 which carries motor pulley 66. Motor speed control can be by any conventional means. For example, a tachometer wheel 68 may be coupled to motor 64 and a reluctance pickup 70 may be provided to sense the speed of wheel 68 and to generate a conventional feedback signal to motor 66 to maintain motor 66 at the selected constant speed. In this manner, motor pulley 66 rotates at a speed proportional to the desired advancement speed of tape 22.

Capstans 40, 42, and 44 are equally positioned around the axis of motor pulley 66. Capstans 40, 42, and 44 are rotatably mounted in deck 14 by means, not shown, for radial and axial rigidity together with rotative freedom. Pulleys 72, 74, and 76 are coplanar with motor pulley 66.

Each of pulleys 66, 72, 74, and 76 has three separate crowns formed therein. Such crowns are engaged by three belts 78, 80, and 82 as illustrated in FIG. 3 where each of pulleys 66, 72, 74, and 76 is illustrated in the same relationship as in FIG. 2. It is to be noted that each of belts 78, 80, and 82 engages substantially a half wrap around motor pulley 66 and then engages in a substantial wrap around each of the three capstan pulleys 72, 74, and 76. In other words, and considering belt 80, for example, belt 80 first wraps around motor pulley 66 by approximately 180° and then contacts capstan pulleys 72 and 76. Because of the close proximity of capstan pulleys 72 and 76 to drive pulley 66, there is an infinitesimal length of belt 80 between drive pulley 66 and capstan pulleys 72 and 76. As mentioned previously, this increases the natural frequency of the drive. After wrapping around capstan pulleys 72 and 76 by substantially more than 180°, belt 80 wraps around capstan pulley 74.

It will be noted that there is a substantial unsupported belt length between capstan pulleys 72 and 74 on the one hand and capstan pulleys 74 and 76 on the other hand. However, this does not affect the natural frequency because of the infinitesimal spacing of drive pulley 66 and capstan pulleys 72 and 76. On the other hand, the unsupported belt length between capstan pulley 74 and capstan pulleys 72 and 76 provides an area where measurements may be made on belt 80 to determine the operation thereof. Furthermore, in order to permit a belt to track between pulleys, that is, to follow the crowns on the pulley surfaces for belt guidence, a fairly long, free, unsupported length of belt between two pulleys is required. Where the unsupported belt length throughout the entire belt is very short, inadequate belt freedom is permitted for proper tracking. However, belt 80, for example, has sufficient unsupported length between pulleys 72 and 74 and pulleys 74 and 76 to permit proper tracking. A similar situation exists with respect to belts 78 and 82.

The arrangement of belts 78 and 82 are the same as just described, each with a 120° rotation. Thus, the result is that there are only six extremely small unsupported belt lengths between motor pulley 66 and capstan pulleys 72, 74, and 76. This construction therefore provides an extremely "stiff" drive which yields extremely low flutter and time base error. Furthermore, it becomes possible to accurately control the rotational speeds of capstans 40, 42, and 44 to achieve any desired degree of differential operation.

With the construction just described, radial loads on motor pulley 66 are equalized to create a substantially zero radial bearing load on motor 64. This is significant when one considers the life-limiting factors of a capstan drive. That is, by locating the three capstan pulleys 72, 74, and 76 symmetrically about capstan motor pulley 66, the radial loads from these three capstans act to equalize each other and consequently decrease the total load on the motor bearings. Of course, the decrease in total load on the motor bearings means a longer life expectancy. However, of even more importance than the elimination of the total load is the elimination of a side load so that no biasing loads are imposed on the bearings at all. This feature contributes significantly to the life expectancy of the bearings.

In addition to the minimization of the total load and the equalization of the radial loads, the particular belt configuration shown in FIGS. 2 and 3 satisfies an additional requirement. That is, it is obvious that each of belts 78, 80, and 82 contacts motor pulley 66 and each of capstan pulleys 72, 74, and 76 so that it is capable of providing adequate drive coupling even in the absence of the other two belts. Thus, the drive is redundant and tape transport 12 could still operate correctly even if one or two belts malfunction.

Another significant feature of drive means 62 is that true zero differential drive may be obtained if desired. More specifically, if the diameters of capstan pulleys 72, 74, and 76 are equal so that they rotate at the same speed and if the diameters of capstan 40, 42, and 44 are also equal, the circumferential speed of the capstan drive surfaces will be identical, providing zero differential operation. This is obviously not possible in any system using an elastic drive since there is simply no way to control the physical properties of a belt well enough to obtain a true zero differential.

In another arrangement, where recording is unidirectional, from right to left in FIG. 2, the diameters of capstans 42 and 44 can be equal and less than the diameter of capstan 40. In such an arrangement, heads 54 and 56 could be employed as the recording heads. Thus, when recording, tape 22, in the head area, has maximum isolation from the supply reel, reel 16, and pure differential tension of a desired degree between capstans 42 and 40. Such an arrangement would be desired to insure good tape-to-head contact while recording under flight environments. However, if benign environments are incurred during the reproduce mode, reproduction can be bi-directional by making heads 58 and 60 reproduce heads. Thus, during the reproduce mode, a zero differential is maintained between capstans 42 and 44 regardless of the direction of movement of tape 22, thereby permitting bi-directional reproduction with identical response. It will be clear to those skilled in the art that other arrangements may be employed in special circumstances.

It can therefore be seen that in accordance with the present invention, there is provided a tape transport 12 for use in a precision magnetic tape recorder/reproducer which truly minimizes flutter, creep, and time displacement errors by eliminating the disadvantages and problems inherent in prior art devices. Tape transport 12 utilizes three capstans 40, 42, and 44 thereby incorporating the advantage thereof of effectively placing two stages of active buffering between the supply reel and the active heads. However, tri-capstan tape transport 12 permits bi-directional differential operation without the use of a plurality of motors, without the use of elastic belts, and without the necessity for belt switching. That is, tape transport 12 utilizes a single motor 64 to provide a hard drive between motor pulley 66 and capstan pulleys 72, 74, and 76 and varies the diameters of capstans 40, 42, and/or 44 or capstan pulleys 72, 74, and/or 76 in a unique manner to provide any degree of differential operation regardless of the direction in which tape 22 moves.

Tape transport 12 further includes a plurality of idlers 36, 38, 46, 48, 50, and 52 which control the path of tape 22 to maximize the wrap of tape 22 around capstans 40, 42, and 44 to improve the instantaneous tape-to-capstan synchronism, thereby still further minimizing creep. As a practical matter, tape transport 12 is capable of achieving a cumulative wrap angle of more than 600° without any capstan contacting the oxide side of tape 22. Furthermore, by wrapping tape 22 around the outside of each of capstans 40, 42, and 44, there is provided a plurality of tangent points adjacent which magnetic heads 54, 56, 58, and 60 can be located, where tape direction is well defined, thereby improving tape-to-head compliance and stability.

While the invention has been described with respect to a preferred physical embodiment constructed in accordance therewith, it will be apparent to those skilled in the art that various modifications and improvements may be made without departing from the scope and the spirit of the invention. Accordingly, it is to be understood that the invention is not to be limited by the specific illustrative embodiments, but only by the scope of the appended claims.

I claim:

1. A bi-directional, differential capstan, tape transport comprising:

three capstans mounted for rotation around spaced, parallel axes;

means for conducting a tape into surface contact with each of said capstans;

means for driving the outer two capstans at a higher peripheral velocity than the central capstan, said driving means being operative to selectively drive said capstans in opposite directions;

first tape utilization means positioned to utilize said tape between said central capstan and one of said outer two capstans;

second tape utilization means positioned to utilize said tape between said central capstan and the other of said outer two capstans; and means for activating said first utilization means when said tape is traveling from said other outer capstan to said central capstan and then to said one outer capstan and for activating said second utilization means when said tape is traveling from said one outer capstan to said central capstan and then to said other outer capstan.

2. A tape transport according to claim 1 wherein said means for driving the outer two capstans at a higher peripheral velocity than the central capstan comprises:

drive means;

a drive pulley associated with said drive means;

a capstan pulley associated with each of said capstans, said capstan pulleys having diameters equal to each other, the diameters of said outer two capstans being greater than that of said central capstan; and belt means for transmitting an equal rotational drive motion from said drive pulley to said capstan pulleys for driving said capstans at the same rotational speed, the increased diameter of said outer two capstans causing said outer two capstans to have a higher peripheral velocity than said central capstan.

3. A tape transport according to claim 1 wherein said means for driving the outer two capstans at a higher peripheral velocity than the central capstan comprises:

drive means;

a drive pulley associated with said drive means;

a capstan pulley associated with each of said capstans, the diameters of the capstan pulleys associated with said outer two capstans being smaller than that of the capstan pulley associated with said central capstan, the diameters of said capstans being equal to each other; and belt means for transmitting an equal rotational driving motion from said drive pulley to said capstan pulleys thereby driving said outer two capstans at a higher rotational speed than said central capstan.

4. A tape transport according to claim 1 wherein said tape is magnetic recording tape, wherein said first utilization means is a first magnetic head positioned to contact said tape between said central capstan and one of said outer two capstans, and wherein said second utilization means is a second magnetic head positioned to contact said tape between said central capstan and the other of said outer two capstans.

5. A tape transport comprising:

three capstans mounted for rotation around spaced, parallel axes;

means for conducting a tape into surface contact with each of said capstans;

means for driving the outer two capstans at a higher peripheral velocity than the central capstan; and a plurality of idlers mounted for rotation around spaced, parallel axes, coplanar with said capstans, for maintaining a tape wrap of at least 180° successively around the outside of all of said capstans.

6. A tape transport according to claim 5 wherein all of said capstans contact the same side of said tape.

7. A tape transport according to claim 6 wherein there are four of said idlers, one of said idlers being positioned between each of said outer two capstans and said central capstan and the remaining two idlers being positioned between said outer two capstans, said capstans and said idlers forming substantially a delta configuration.

8. A tape transport according to claim 6 further comprising:

four magnetic heads positioned to contact said tape on the side thereof opposite to the side contacted by said capstans, two of said heads being positioned to contact said tape between one of said outer two capstans and said central capstan and the remaining two heads being positioned to contact said tape between the other of said outer two capstans and said central capstan, all of said heads being positioned to contact said tape where said tape is tangent to one of said capstans, the unsupported length of tape between each capstan and each of said heads being less than the radii of said capstans.

9. A tape transport comprising:

three capstans mounted for rotation around spaced, parallel axes;

means for conducting a tape into surface contact with each of said capstans;

means for driving the outer two capstans at a higher peripheral velocity than the central capstan; and a plurality of idlers mounted for rotation around spaced, parallel axes, coplanar with said capstans, for maintaining a tape wrap successively around the outside of all of said capstans, said idlers effecting a cumulative wrap angle around said capstans of at least 540°, with each of said capstans being in driving engagement with the same side of said tape.

10. A tape transport for imparting a predetermined tension to a tape comprising:

drive means;

drive pulley means associated with said drive means;

first, second, and third capstans means arranged to sequentially contact said tape;

first, second and third capstan pulley means associated with said first, second, and third capstan means, respectively; and belt means interconnecting said drive pulley means and said first, second, and third capstan pulley means for transmitting an equal rotational driving motion from said drive pulley means to said first, second, and third capstan pulley means thereby driving said first, second, and third capstan pulley means with the same peripheral velocity.

11. A tape transport according to claim 10 wherein the diameters of said first, second, and third capstan pulley means are equal to each other and wherein the diameter of said first capstan means is greater than that of said second capstan means.

12. A tape transport according to claim 11 wherein the diameter of said second capstan means is equal to that of said third capstan means.

13. A tape transport according to claim 11 wherein the diameter of said third capstan means is greater than that of said second capstan means.

14. A tape transport according to claim 13 wherein the diameter of said third capstan means is equal to that of said first capstan means.

15. A tape transport according to claim 10 wherein the diameters of said first, second, and third capstan means are equal to each other and wherein the diameter of said first capstan pulley means is less than that of said second capstan pulley menas.

16. A tape transport according to claim 15 wherein the diameter of said second capstan pulley means is equal to that of said third capstan pulley means.

17. A tape transport according to claim 15 wherein the diameter of said third capstan pulley means is less than that of said second capstan pulley means.

18. A tape transport according to claim 17 wherein the diameter of said third capstan pulley means is equal to that of said first capstan pulley means.

19. A tape transport for imparting a predetermined tension to a tape comprising:

drive means;

drive pulley means associated with said drive means;

first, second, and third capstan means arranged to sequentially contact said tape;

first, second, and third capstan pulley means associated with said first, second, and third capstan means, respectively, said first second and third capstan pulley means being substantially equiangularly spaced around said drive pulley means; and belt means interconnecting said drive pulley means and said first, second, and third capstan pulley means for transmitting an equal rotational driving motion from said drive pulley means to said first, second, and third capstan pulley means thereby driving said first, second, and third capstan pulley means with the same peripheral velocity, said belt means comprising:

first, second, and third drive belts, each of said drive belts extending as a closed loop around each of said capstan pulley means and passing around said drive pulley means so that said drive pulley means is disposed outside of said loop, said drive belts being substantially equiangularly spaced and substantially equally tensioned around said drive pulley means to provide a balanced radial loading on said drive pulley means, the unsupported length of each of said drive belts between said drive pulley means and said capstan pulley means being infinitesimally small, the unsupported length of each of said drive belts between said capstan pulley means being relatively large whereby said capstan pulley means are connected to said drive pulley means by six infinitesimally small belt lengths thereby providing a "hard" drive and said capstan pulley means are connected to each other by six relatively long belt lengths providing belt measurement areas and permitting proper tracking.

20. A tape transport according to claim 19 wherein said drive pulley means is spaced from each of said first, second, and third capstan pulley means by more than one and less than ten drive belt thicknesses.

21. A tape transport for imparting a predetermined tension to a tape comprising:

drive means;

drive pulley means associated with said drive means;

first, second and third capstan means arranged to sequentially contact said tape;

first, second, and third capstan pulley means associated with first, second, and third capstan means, respectively;

belt means interconnecting said drive pulley means and said first, second, and third capstan pulley means for transmitting an equal rotational driving motion from said drive pulley means to said first, second, and third capstan pulley means thereby driving said first, second, and third capstan pulley means with the same peripheral velocity; and a plurality of idlers mounted for rotation around spaced, parallel axes, coplanar with said first, second, and third capstan means, for maintaining a tape wrap of at least 180° successively around the outside of said first, second, and third capstan means.

22. A tape transport according to claim 21 wherein all of said capstan means contact the same side of said tape.

23. A tape transport according to claim 22 further comprising:

four magnetic heads positioned to contact said tape on the side thereof opposite the side contacted by said first, second, and third capstan means, two of said heads being positioned to contact said tape between said first and said second capstan means and the remaining two heads being positioned to contact said tape between said second and said third capstan means, all of said heads being positioned to contact said tape where said tape is tangent to one of said capstan means, the unsupported length of tape between each of said capstan means and each of said heads being less than the radii of said capstan means.

24. A tape transport comprising:

drive means;

drive pulley means associated with said drive means;

first, second, and third capstan means arranged to sequentially contact said tape;

first, second, and third capstan pulley means associated with said first, second, and third capstan means, respectively;

belt means for transmitting a rotational driving motion from said drive pulley means to said first, second, and third capstan pulley means;

first, second, third, and fourth idler means mounted for rotation coplanar with said capstan means, said first idler means being positioned between said first and second capstan means, said second idler means being positioned between said second and third capstan means, and said third and fourth idler means being positioned between said first and third capstan means, said idler means and said capstan means thereby forming substantially a delta configuration, said idler means effecting a cumulative wrap angle of said tape around said capstan means of more than 600°, with each of said capstan means being in driving engagement with the same side of said tape.

25. A tape transport according to claim 24 further comprising:

first, second, third, and fourth magnetic head means positioned to contact said tape on the side thereof opposite to the side contacted by said capstan means, said first and second head means being positioned to contact said tape between said first and second capstan means and said third and fourth head means being positioned to contact said tape between said second and third capstan means, all of said head means being positioned to contact said tape where said tape is tangent to one of said capstan means, the unsupported length of tape between each of said capstan means and each of said head means being less than the radii of said capstan means.

* * * * *